(No Model.)
W. H. CLAY.
MARKING ATTACHMENT FOR CORN PLANTERS.
No. 329,143. Patented Oct. 27, 1885.
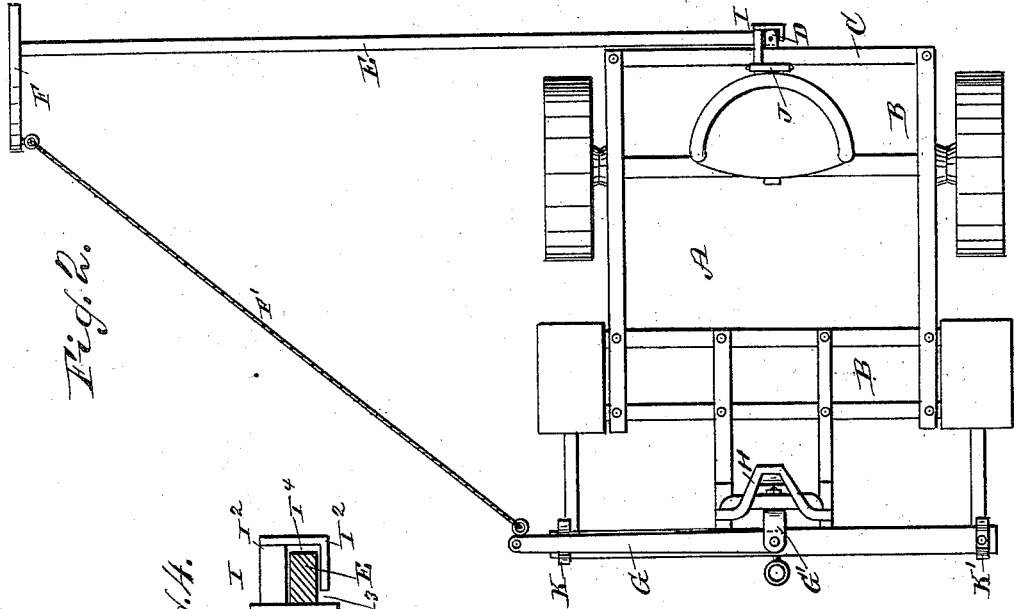
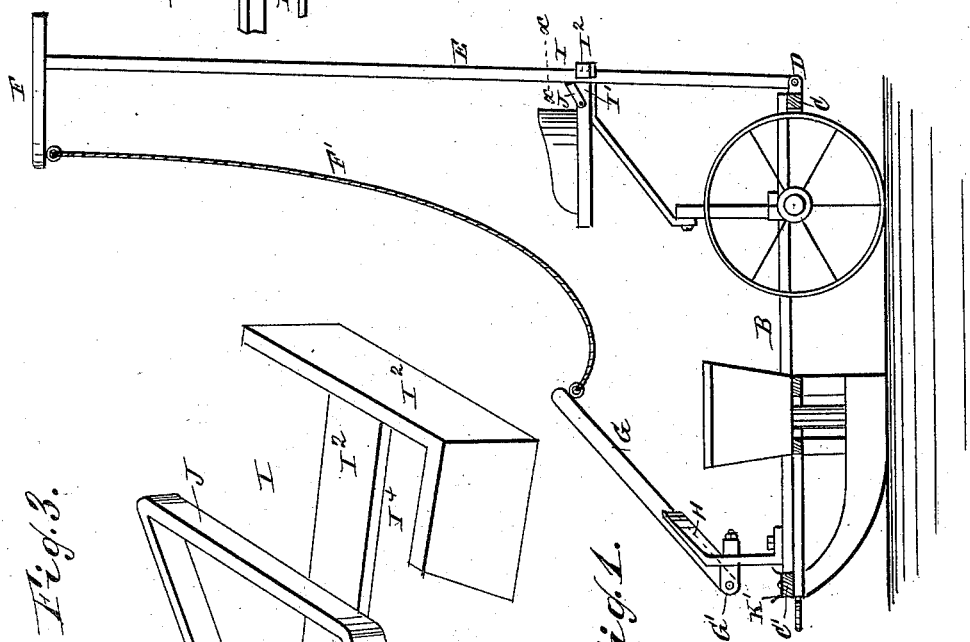
WITNESSES:
INVENTOR:
W. H. Clay
BY Munn & Co.
ATTORNEYS.

UNITED STATES PATENT OFFICE.

WILLIAM H. CLAY, OF PARIS, KENTUCKY, ASSIGNOR TO HIMSELF AND FRANK P. CLAY, JR., OF SAME PLACE.

MARKING ATTACHMENT FOR CORN-PLANTERS.

SPECIFICATION forming part of Letters Patent No. 329,143, dated October 27, 1885.

Application filed April 8, 1885. Serial No. 161,574. (No model.)

*To all whom it may concern:*

Be it known that I, WILLIAM H. CLAY, of Paris, in the county of Bourbon and State of Kentucky, have invented a new and Improved Marking Attachment for Corn-Planters, of which the following is a full, clear, and exact description.

The object of my invention is to provide a new and improved marking attachment, which can be shifted from one side of a corn-planter to the other, and to provide a device for holding and locking the marking attachment in an upright position when not in use.

The invention consists of a swiveled piece to which the marking attachment is pivoted, of a device fastened to the seat of a corn-planter for locking the marking attachment, and of a movable rope-carrier pivoted to a swiveled piece, which is secured to an inclined frame attached to the frame of the corn-planter.

The invention also consists in various parts and details, hereinafter more fully set forth and described.

Reference is to be had to the accompanying drawings, forming part of this specification, in which similar letters of reference indicate corresponding parts in all the figures.

Figure 1 is a side elevation of a corn-planter provided with my marking attachment, which is locked in an upright position. Fig. 2 is a plan view of Fig. 1, showing the marking attachment lowered to the ground and ready for use. Fig. 3 is a perspective view of the locking device, and Fig. 4 is a horizontal cross-section on the lines $x\ x$ of Fig. 1.

The corn-planter A may be of any approved construction, and provided with the usual main frame, B, mounted on wheels, a runner-frame, seed-boxes, dropping attachments, driver's seat, &c. To a rear cross-bar, C, of the main frame B, is secured a swiveled piece, D, to which the pole E, carrying the marker F, is pivoted. A rope, F', connects the marker F with a lever, G, pivoted to a swiveled piece, G', which is secured to a small inclined frame, H, attached in the center of the front part of the main frame B.

A device, I, for holding and locking the pole E of marker F, is fastened in any suitable manner to the under side of the driver's seat, and extends backward therefrom. The locking device I consists of the frame I', the L-shaped extension I², forming the aperture I³, through which pole E is passed, and the recess I⁴, in which the said pole E is held, and of the latch J, pivoted to the outer sides of the frame I'. The front cross-bar, C', of main frame B, is provided on top, at each outer end, with the U-shaped keepers K K', for holding the rope-carrier G in place, when the same is lowered and ready for use, as shown in Fig. 2.

My marking attachment is used and operated as follows: The marking attachment, when lowered to the ground, as shown in Fig. 2, is used for making a small furrow parallel with the center line of the corn-planter as the same is drawn across the field, which furrow serves as a guide for the next row to be planted. In turning the corn-planter at the end of the field the marking attachment is lifted from the ground, swinging from the swiveled piece D as its fulcrum, and the plate E is passed through aperture I³ into the recess I⁴ of the locking-frame I, and locked therein by pressing the pivoted latch J downward against one edge of the pole E. At the same time that the pole E and marker F are raised the rope F' lifts the rope-carrier G from the keeper K and places it in the inclined frame H, where it rests until the pole E, carrying the marker F, is changed to another position. After the planter has been turned the marking attachment is freed from its locked position by raising the latch J and lowering the marking attachment on the opposite side of the corn-planter, whereby the rope-carrier is also swung from frame H and placed in the opposite keeper, K', by the rope F', attached to marker F. The marking attachment is conveniently operated from the driver's seat. The rope-carrier G and rope F' hold the marking attachment in a parallel position to the corn-planter. The marking attachment is also held in a locked position, as shown in Fig. 1, when the corn-planter is in transit to or from the place of operation.

Having thus described my invention, I claim as new and desire to secure by Letters Patent—

1. The combination of the planting-frame, the marking-pole pivoted thereto, the rope-carrier swiveled at one end to the forward end of the planter-frame, a rope connecting said carrier with the marking-pole, and a centrally-depressed frame mounted on the forward end of the planter-frame, midway the sides thereof, and adapted to receive and support the rope-carrier, substantially as set forth.

2. In combination with the planter-frame and the marking-pole pivoted thereto, the locking device I, the catches K K', located at the opposite sides of the forward end of the machine, the rope-carrier G, swiveled at one end of the planter-frame, and having its other end connected with the marking-pole, and a centrally-depressed inclined frame, H, substantially as set forth.

3. In a marking attachment, the swiveled piece D, the pole E, the marker F, the rope F', the rope-carrier G, and the swiveled piece G', in combination with the inclined frame H, substantially as shown and described.

4. In a marking attachment, the swiveled piece D, the pole E, the marker F, the rope F', the rope-carrier G, the swiveled piece G', and the inclined frame H, in combination with the keepers K and K', attached to the front cross-bar, C', of main frame B, substantially as shown and described.

5. In a marking attachment, the swiveled piece D, the pole E, the marker F, the rope F', the rope-carrier G, the swiveled piece G', and the frame H, in combination with the locking device I, substantially as shown and described.

6. In a marking attachment, the locking device I, consisting of the frame I', L-shaped extension $I^2$, forming the aperture $I^3$, and recess $I^4$, and of the pivoted latch J, substantially as shown and described.

WILLIAM H. CLAY.

Witnesses:
   GEO. T. McCARNEY,
   J. D. GASS.